Dec. 20, 1966 — R. S. ROVINSKY — 3,292,886
BRACKET
Filed Feb. 18, 1966
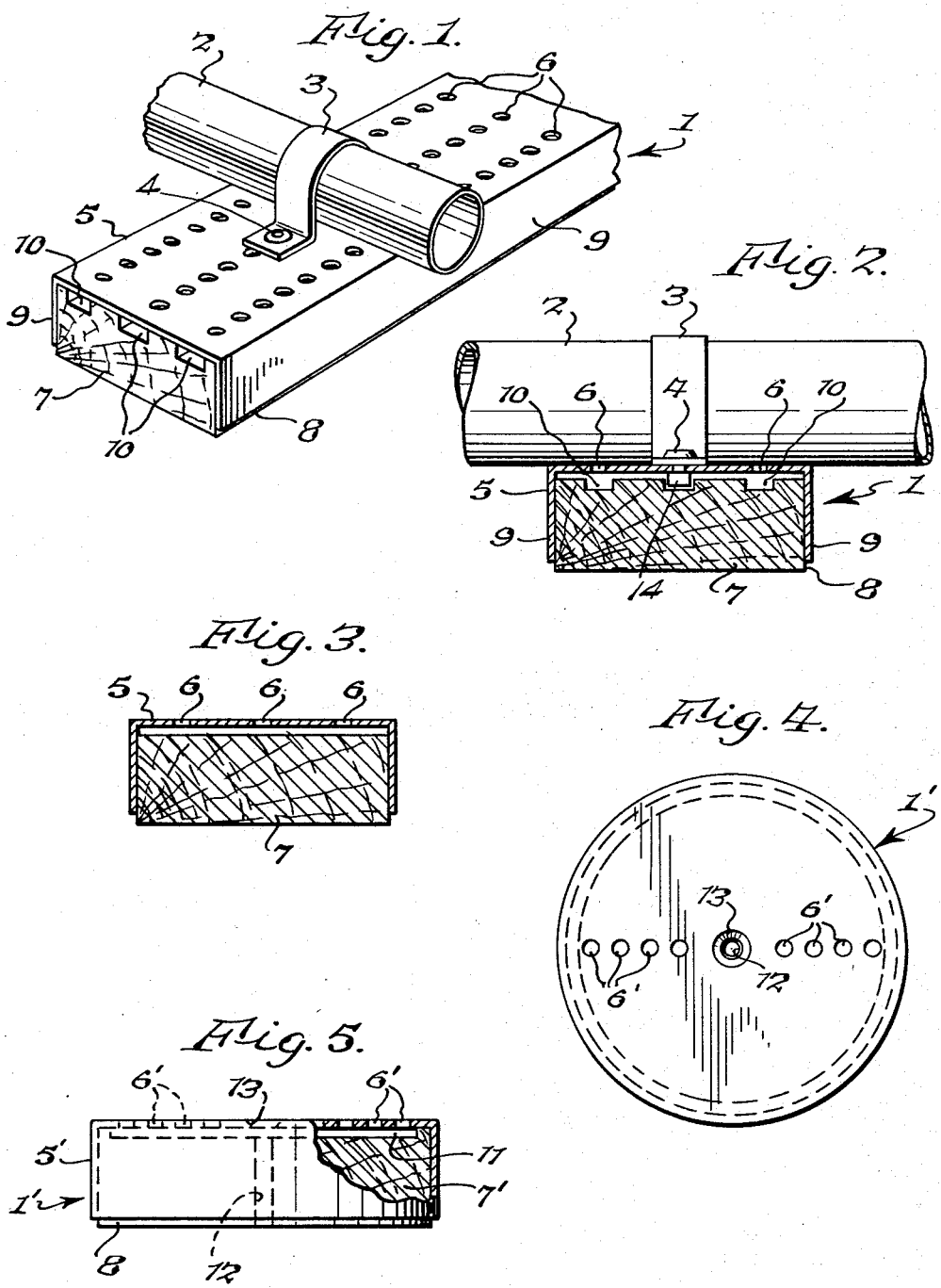
INVENTOR.
Robert S. Rovinsky
BY
Christel & Bean
ATTORNEYS.

United States Patent Office 3,292,886
Patented Dec. 20, 1966

3,292,886
BRACKET
Robert S. Rovinsky, 1 Nimitz Court,
Tonawanda, N.Y. 14150
Filed Feb. 18, 1966, Ser. No. 528,555
7 Claims. (Cl. 248—49)

This invention relates to the support art, and in particular to a support bracket to which tubing, pipes, conduits, cables, or the like, hereinafter referred to as pipe, can be secured.

Pipe is oftentimes supported by makeshift means in the form of scrap lumber or other left-over building materials which are secured to fixed support members such as rafters or beams in a haphazard and unsightly manner. Makeshift pipe supports provide inadequate as they necessarily increase the cost of installation and often do not provide sufficient support for additional pipe subsequently laid. Preformed pipe supports are available, but generally require access behind the support to secure pipe thereto rendering pipe installation inconvenient if not impractical and, in any event, costly. Some pipe supports do not isolate pipe from other construction materials and therefore impart the thermal or electrical characteristics of the pipe, as the case may be, to adjacent pipe or construction.

Additionally, most known pipe supports, once fixed to a support member, are often misaligned and cannot readily support pipe having a different angle of run than the specific angle of run for which the pipe support is initially adapted. A misaligned support must be reinstalled or bypassed at great inconvenience and expense.

Accordingly, it is a primary object of the present invention to provide a preformed pipe bracket having a fastener receiving frontal face for securing a variety of pipe sizes thereto without requiring access behind the bracket or to the rear portion thereof.

It is another object of the present invention to provide a preformed pipe bracket having fastener receiving openings at predetermined closely spaced intervals along the frontal face thereof to accommodate fasteners for securing pipe thereto at any point along the length thereof and for securing the pipe bracket to fixed supports at any point along the pipe bracket, the latter excluding the spacing between the fixed supports as a critical factor in designing the pipe bracket.

It is an object of the present invention to provide a preformed pipe bracket support which is rotatably secured to the fixed support member prior to pipe installation for aligning the pipe bracket support with the angle of pipe run to meet and carry same.

It is an object of the persent invention to provide a pipe support of the foregoing characteristics having an outer metallic casing with a backing filler block, each reinforcing the other thereby forming a high-strength distortion resistant pipe support.

It is a further object of the present invention to provide a pipe support of the foregoing characteristics constructed to thermally and electrically isolate the pipe from the fixed support member while providing a stable backing support surface for abutment against a fixed support member.

The invention is characterized in one aspect thereof by a backing block adapted to be secured to a fixed support, a cover member overlying and secured to one face of the block, and a plurality of fastener receiving apertures through the cover member at predetermined spaced intervals, at least those portions of the block face in registry with the apertures being spaced from the cover member, thereby providing a cavity behind each aperture to accommodate rivet and like fasteners, the block being adapted to receive and retain nail and screw type fasteners inserted through the apertures.

Various other novel details of construction and advantages inherent in the bracket construction of the present invention are pointed out in detail in conjunction with the following description of two typical embodiments of the invention, one of which is shown in several modifications, reference being made to the accompanying drawing. It will be understood that these embodiments are by way of example only and to illustrate the principles of the present invention, the scope of which is to be limited only as defined in the appended claims.

In the drawing:

FIG. 1 is a front perspective view of one form of bracket of the present invention, shown with a pipe secured thereto, the bracket being broken away for ease of illustration and to indicate indeterminate length;

FIG. 2 is an end elevation of a modification of the bracket of FIG. 1;

FIG. 3 is an end elevation of another modification of the bracket of FIG. 1;

FIG. 4 is a top plan view of another embodiment of bracket of the present invention; and FIG. 5 is a fragmentary view, partly in elevation and partly in section, of the bracket of FIG. 4.

Referring now to FIG. 1 of the drawing, there is shown a bracket, generally designated 1, supporting a pipe 2 mounted thereon by a tubing strap 3 secured to bracket 1 by fasteners 4. Bracket 1 comprises a housing member or cover 5 which, in a preferred form, is a channel member formed from sheet metal. A plurality of openings or apertures 6 are formed in member 5, to receive fasteners 4. Apertures 6 are longitudinally spaced at predetermined intervals along the intermediate portion of channel member 5, and are formed in predetermined, transversely spaced rows, thereby adopting bracket 1 to accommodate tubing of different sizes. The longitudinal spacing between apertures 6 can be one quarter inch, that being a common pipe module unit, although units of other spacing can be used.

A backing, filler block 7 is secured within channel 5 by suitable means, such as fasteners (not shown), adhesive bonding, press fit or the like. A portion 8 of filler block 7 extends beyond the opposite sides 9 of housing member 5 and is exposed, so that filler block 7 can be directly secured to a fixed support, not shown, without interference from metallic housing 5. In this way, block 7 thermally and electrically insulates cover 5 from the fixed support. Filler block 7 preferably is formed of wood, but can be a laminate, plastic or other suitable material, keeping in mind that block 7 not only provides a base for receiving and retaining fasteners screwed or driven therein but also reinforces and structurally strengthens sheet metal member 5.

The filler block and channel member combination may be of any desired length, sufficient to span two or more spaced fixed support members, and may be initially formed in long sections and subsequently cut to the desired lengths prior to installation.

Filler block 7, in the forms shown in FIGS. 1 and 2, has three transversely spaced, longitudinally extending grooves 10 in the face thereof adjacent the apertured wall of member 5, and in registry with the rows of apertures 6. The inner face of block 7 can abut the intermediate wall portion of channel 5, as in FIG. 1, or can be spaced therefrom as in the modification of FIG. 2. In both cases, grooves 10 form recesses or cavities behind the apertured intermediate portion of channel 5, in registry with apertures 6, the cavities being wider than apertures 6 for receiving and accommodating the heads 14 of rivet type fasteners 4, as seen in FIG. 2.

In the modified form of FIG. 3, the entire inner face of filler block 7 is spaced from the intermediate apertured portion of channel 5. In this manner, one large cavity is provided behind the apertured face of housing member 5 for receiving fasteners 4.

In the embodiment of FIGS. 4 and 5, there is shown a round, disc type bracket 1' having a cylindrical filler block 7' snugly received and adhesively bonded or otherwise secured within a circular inverted cup-shaped housing member 5'. A plurality of apertures 6' extend through the end face wall of member 5'. Apertures 6' are diametrally arranged and, like apertures 6, are spaced apart at predetermined increments. Filler block 7' preferably abuts the apertured end face of housing 5' and has a recess 11 in the top portion thereof in registry with apertures 6'. In the illustrated embodiment the entire inner end face of block 7' is recessed, except at its periphery. As in the preceding embodiments, recess 11 receives rivet type fasteners passing through apertures 6' for securing a strap 3 and pipe 2 to support bracket 1'. It will be understood that filler block 7' could instead be spaced from the apertured face of member 5', in the manner of block 7 in FIG. 3.

A portion 8' of filler block 7' is exposed and extends beyond the annular side wall 9' of housing 5' for engagement with a fixed support. A passage 12 extends axially through block 7' in alinement with a countersunk opening 13 through the apertured end wall of member 5' for receiving a fastener, not shown, for rotatably securing support bracket 1' to a fixed support. Bracket 1' can be rotated during installation for alinement normal to any angle of pipe run. Tapered opening 13 enables flush fit of such fastener with the exterior surface of member 5'.

In use, bracket 1, depicted in FIGS. 1–3, is secured to a fixed support as by means such as nails, screws, or the like (not shown) passing through apertures 6 and filler block 7 into the fixed support. The plurality of apertures 6 and predetermined spacing of the apertures adapts the bracket to receive fasteners at virtually any point therealong and largely eliminates the relative positions of pipe and fixed supports and the spatial relation between fixed support members as critical factors in positioning the pipe and support bracket. The embodiment shown in FIGS. 4–5 is fastened to a fixed support through opening 12 and preferably left free to rotate for cross alignment with the pipe run. In neither case is it necessary to have access to the rear of the bracket. Pipe 2 is then laid across the apertured surface of the housing 5 or 5' and strap 3 is placed over the pipe with the holes in the ends of bracket 3 in registry with apertures 6 or 6'. The arrangement and spacing of apertures 6 and 6' is such as to accommodate a wide variety of pipe and strap sizes.

It is a significant feature of my invention that the fasteners used to secure the pipe to the bracket are fastened to the latter from the exposed outer side thereof, without manipulation of a work tool or other need for access behind the bracket. The provision of enlarged cavities behind apertures 6 and 6' permit pop type rivets and the like to be used, as shown in FIG. 2. Nails, screws and the like also can be used, being screwed or driven through the apertures and cavities and into the filler block 7 or 7'.

Preferably, apertures 6 and 6' are sufficiently small as to bind screw and nail type fasteners. Thus, additional holding strength is provided for securing pipe to the support bracket. Additionally, the close, predetermined spacing of apertures 6 and 6' adapts the bracket for securing pipes of a wide variety of sizes, while the rows of apertures in the first embodiment allow placement of brackets 3 in alternate rows for closer positioning of pipes 2 on the bracket.

It is apparent that the objects of my invention are attained by the foregoing provision of a pipe support bracket requiring access only on the outer side thereof and having parts thereof snugly fitting and mutually reinforcing one another and adapted to isolate and insulate the supported pipe from the fixed support.

Having fully disclosed and completely described my invention, in the foregoing illustrative embodiments thereof, what I claim as new is:

1. A bracket for receiving fasteners securing tubing and the like thereto and adapted for connection to a fixed support comprising a backing block adapted to be secured to a fixed support, a cover member secured to said block, said cover member overlying one face of said block and having a plurality of fastener receiving apertures therethrough at predetermined spaced intervals therealong, at least those portions of said one face of said block in registry with said apertures being spaced from cover member, thereby providing a cavity behind each of said apertures to accommodate rivet and like fasteners, said block being adapted to receive and retain nail and screw type fasteners inserted through said apertures.

2. A bracket according to claim 1 wherein said cover member is a channel member and said block is a filler block snugly received within said channel member, said filler block extending beyond the opposite sides of said channel member for abutment against a fixed support, thereby insulating said channel member therefrom.

3. A bracket according to claim 1 wherein said portions in registry with said apertures comprise at least one recessed portion in said one face of said block.

4. A bracket according to claim 1, wherein said portions in registry with said apertures comprise a plurality of transversely spaced grooves in said one face of said block.

5. A bracket according to claim 1 wherein said one face of said block is spaced from said overlying cover member.

6. A bracket according to claim 1 wherein said cover member and said block are circular, and wherein said bracket includes means for rotatably securing said bracket to a fixed support.

7. A bracket support according to claim 6 wherein said apertures are diametrally spaced along said cover member.

No references cited.

CLAUDE A. LE ROY, *Primary Examiner.*